(12) United States Patent
Wade et al.

(10) Patent No.: US 12,304,495 B1
(45) Date of Patent: May 20, 2025

(54) TORQUE LIMITS FOR LOW FRICTION DRIVING

(71) Applicant: Zoox, Inc., Foster City, CA (US)

(72) Inventors: Joshua Caleb Wade, Redwood City, CA (US); Luis Riera, Redwood City, CA (US); Satya Rama Aditya Pinapala, Santa Clara, CA (US); Thomas Mueller-Werth, Santa Clara, CA (US); Yufei Zhu, Santa Clara, CA (US); Saul Martin Silverberg, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/362,948

(22) Filed: Jul. 31, 2023

(51) Int. Cl.
*B60W 10/04* (2006.01)
*B60W 40/06* (2012.01)

(52) U.S. Cl.
CPC ............ *B60W 40/06* (2013.01); *B60W 10/04* (2013.01); *B60W 2520/105* (2013.01); *B60W 2520/26* (2013.01); *B60W 2710/0666* (2013.01); *B60W 2710/083* (2013.01)

(58) Field of Classification Search
CPC ................. B60W 40/06; B60W 10/04; B60W 2520/105; B60W 2520/26; B60W 2710/0666; B60W 2710/083
See application file for complete search history.

(56) References Cited

U.S. PATENT DOCUMENTS

| | | | |
|---|---|---|---|
| 10,518,775 B1 * | 12/2019 | Velazquez Alcantar | B60L 15/2045 |
| 2006/0237244 A1 * | 10/2006 | Hommi | B60K 6/48 180/65.235 |
| 2018/0037219 A1 * | 2/2018 | Johri | B60W 30/18072 |
| 2022/0212544 A1 * | 7/2022 | Keller | B60L 3/102 |

FOREIGN PATENT DOCUMENTS

DE 102016219124 A1 * 4/2018 ....... G08G 1/096775

* cited by examiner

*Primary Examiner* — Tisha D Lewis
(74) *Attorney, Agent, or Firm* — Lee & Hayes, P.C.

(57) ABSTRACT

Techniques for controlling a vehicle on a low friction surface are discussed herein. An acceleration of a motor of a drive unit of a vehicle may be monitored to identify an anomalous acceleration, such as an acceleration equal to or above a threshold acceleration. In response to identifying the anomalous acceleration, a torque limit for driving the drive unit may be limited, e.g., according to a modified torque limit. In examples the modified torque limit may be a percentage of a nominal maximum torque for driving the drive unit.

20 Claims, 5 Drawing Sheets

TORQUE LIMITS FOR LOW FRICTION DRIVING

BACKGROUND

Environmental conditions can influence vehicle control. For example, water, ice, and/or the like can reduce friction on a driving surface. Reduced friction driving surfaces can cause wheels to slip, e.g., during acceleration, or to lock-up, e.g., during braking. Drivers can often anticipate poor road conditions, e.g., by observing ice and/or water on the driving surface. In autonomous vehicles, however, no driver is available to anticipate these conditions. Systems and methods to determine information about adverse driving conditions, and controlling a vehicle to respond to those road conditions, may be useful to improve safety outcomes, such as on wet, icy, and/or other low-friction driving surfaces.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

SUMMARY OF THE INVENTION

Systems and techniques for controlling a vehicle by altering or limiting torque controls are described herein. For instance, and without limitation, examples of this disclosure may include identifying and responding to anomalous driving conditions resulting from low friction driving surfaces, such as wet and/or icy driving surfaces, loose gravel, and/or other low friction surfaces.

Aspects of this disclosure may include monitoring accelerations at motors used to drive wheels of a vehicle. For instance, a vehicle may have a first drive unit associated with one or more first wheels of the vehicle and a second drive unit associated with one or more second wheels of the vehicle. Individual of the drive units can include an actuator, such as an electromagnetic motor. The electromagnetic motor can include a rotor configured to rotate relative to a stator. Aspects of this disclosure can include monitoring the acceleration of the rotor.

In examples of this disclosure, a measured acceleration may be compared to a threshold acceleration. For example, the threshold acceleration may correspond to an anomalous driving condition. For example, during a wheel slip event, wheel locking event, or other event that can occur on low friction surfaces, the rotor may experience a large acceleration spike. Thus, aspects of this disclosure can include inferring a low friction event based on measuring the acceleration to be equal to or above the acceleration threshold. In at least some such examples, the acceleration associated with the rotor may be independent from one or more of an angular acceleration of a wheel, a linear or angular acceleration of the vehicle body, or any other component of the vehicle.

Aspects of this disclosure can include determining a modified torque limit based on the acceleration. For example, during a low-friction driving event, the wheels may experience locking up, slippage, or the like. Continued application of high torque in these conditions can exacerbate the event. Instead, aspects of this disclosure may determine a modified, lower torque limit for the actuator experiencing the low friction event. For instance, the modified torque limit can be a torque limit that is lower than a maximum nominal torque limit associated with nominal driving conditions, e.g., in the absence of a low friction and/or other event. In examples, the modified torque limit can be a percentage of the maximum nominal torque limit. Response to these events may be triggered based on the rotor acceleration to provide an earlier response to such events as well as to potentially preempt latency issues associated with relying on other components and/or subcomponents (e.g., an electronic stability control (ESC) unit, an automated braking system (ABS), or the like).

Aspects of this disclosure can also include controlling the vehicle in accordance with the modified torque limit. For example, a drive unit may be controlled according to a modified torque that is determined based at least in part on the modified torque limit. In examples, by reducing the applied torque, wheel slippage and/or wheel lock conditions can be more quickly rectified.

Aspects of this disclosure can be implemented by a torque limiting control system that functions in parallel with existing torque control systems and methodologies. For example, the torque limiting control system may be configured to receive acceleration data directly from an actuator of a drive unit. Instead of existing torque control systems that have additional processing and/or functionality that result in increased latency, aspects of this disclosure may more quickly implement torque controls. Such controls may improve driving outcomes, e.g., by more readily and and/or quickly mitigating the effects of low friction driving surfaces.

DETAILED DESCRIPTION

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in a semi-autonomous or manual vehicle.

Figure 1:
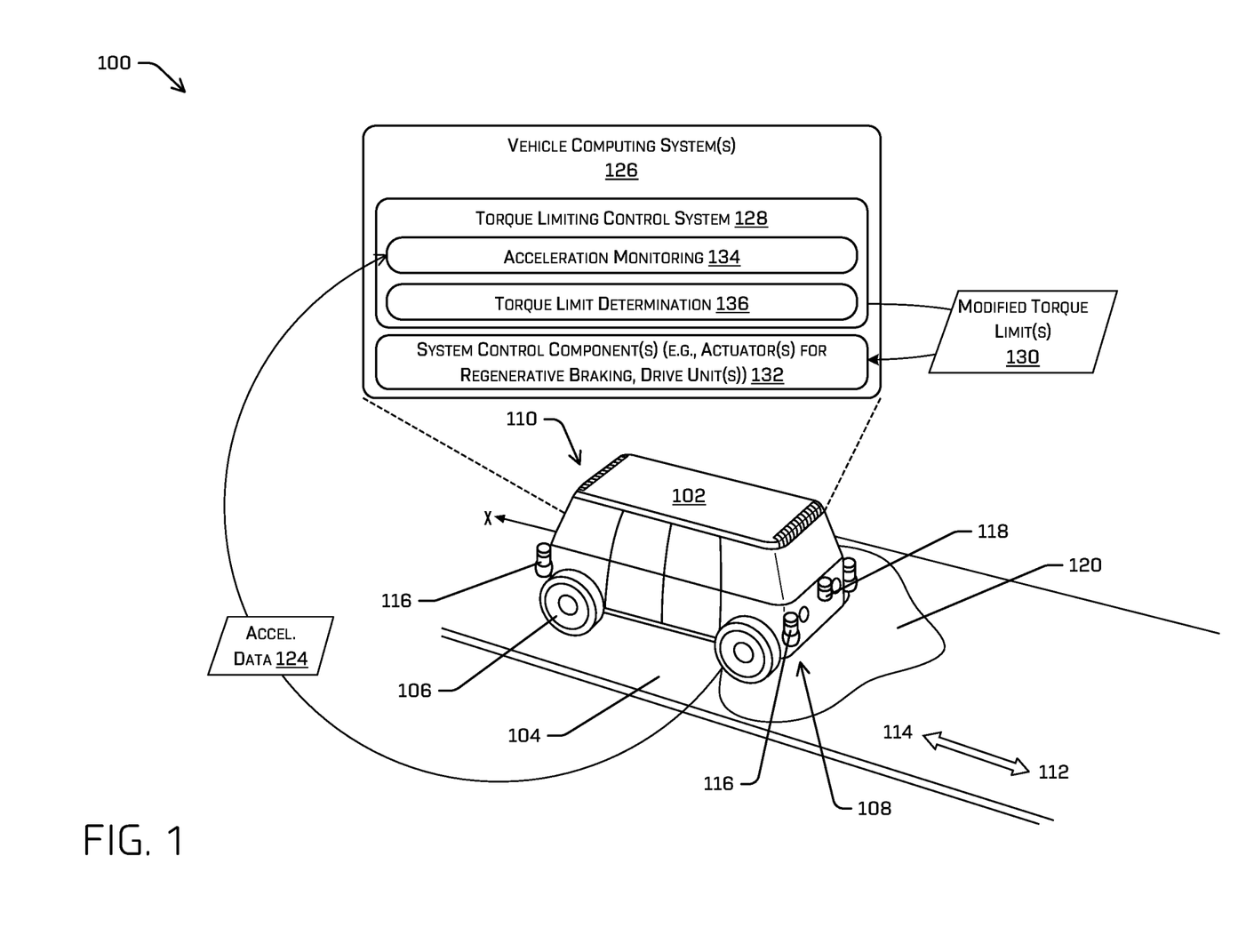
FIG. 1 is a schematic representation illustrating example systems and techniques for modifying torque commands to control aspects of a vehicle driving on low friction surfaces, as described herein.

FIG. 1 is a perspective view showing aspects of the present disclosure. More specifically, FIG. 1 illustrates an example environment 100 that includes a perspective view of a vehicle 102 equipped with systems and components for, among other functionality, determining potentially unsafe driving conditions caused by low friction driving surfaces and controlling the vehicle 102 to drive on such surfaces, in accordance with embodiments of the disclosure. In some embodiments, the environment 100 may include one or multiple features, components, and/or functionalities. The environment 100 is shown for example only.

In the illustration of FIG. 1, the vehicle 102 is configured to travel across a surface 104 (e.g., a road surface, a drivable surface, and/or a navigable surface, etc.), for example, to transport people and/or cargo from a first location to a second location. The vehicle 102 may be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, the vehicle 102 may be unoccupied and/or may lack standard interfaces and control features, e.g., a steering wheel, accelerator and/or brake pedals, or the like. However, aspects of this disclosure are not limited to use in autonomous vehicles: the vehicle 102 may be any vehicle and/or robot. Without limitation, the vehicle 102 may be manually controlled by a driver at all times, may be capable of performing some actions autonomously and require manual control for other actions, and/or be otherwise configured and/or controlled.

The vehicle 102 of FIG. 1 is illustrated as an automobile having four wheels 106 on which the vehicle 102 traverses the surface 104 in the environment 100. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, or any combination thereof. In addition, although the example vehicle 102 has four wheels 106, the systems and methods described herein may be incorporated into vehicles having fewer or a greater number of wheels, tires, and/or tracks.

The example vehicle 102 may have four-wheel steering and may operate generally with equal performance characteristics in all directions. For instance, the vehicle 102 may be configured for selective bi-directional travel, in which a first end 108 of the vehicle 102 is the front end of the vehicle 102 and a second end 110 of the vehicle 102 is the rear end of the vehicle when traveling in a first direction 112, and such that the first end 108 is the rear end of the vehicle 102 and the second end 110 is the front end of the vehicle when traveling in an opposite, second direction 114. These example characteristics and capabilities may facilitate greater maneuverability, for example, in small spaces or crowded environments, such as parking spaces, parking lots, urban areas, or the like.

The vehicle 102 also may include, or have associated therewith, one or more sensors 116 (and/or sensor devices). For example, the sensor(s) 116 may include one or more radar sensors, one or more cameras, one or more LIDAR devices, one or more time-of-flight sensors, and/or other types of sensor modalities. In the example of FIG. 1, one or more of the sensor(s) 116 may be provided as sensor pods coupled to the vehicle 102. Although the sensor(s) 116 are illustrated as coupled to sides of the vehicle 102, some or all of the sensor(s) 116 may be roof-mounted and/or otherwise positioned on or with respect to the vehicle 102. The sensor(s) 116 are disposed to sense objects in the environment 100. In some examples, the sensor(s) 116 may have a field of view in the environment 100 and the aggregate of all fields of view may be substantially 360-degrees around the vehicle.

The vehicle 102 is illustrated as including a radar sensor 118, which may be one of the sensor(s) 116. The radar sensor 118 is illustrated as being fixed to the first end 108 of the vehicle 102. When the vehicle 102 is configured to travel with the first end 108 as a leading end, e.g., in the first direction 112, the radar sensor 118 generates radar data 120 in a field of view corresponding to a portion of the environment 100 in front of the vehicle 102, e.g., in the direction of travel. Although the radar sensor 118 is illustrated as being mounted on the side of the body of the vehicle, in other examples the radar sensor 118 may be mounted on the roof of the vehicle 102 or at some other location to generate data in front of the vehicle 102.

As also illustrated in FIG. 1, the surface 104 includes a low-friction portion 120. As used herein, the low-friction portion 120 may be any driving surface or portion of a driving surface that has reduced friction and/or may cause a vehicle, like the vehicle 102, to lose or potentially lose some traction and/or control functionality. For example, the low-friction portion 120 may be a puddle or other collection of water on the surface 104. In other examples, the low-friction portion may be a patch of ice or snow. In still further examples, the low-friction portion may include loose gravel, sediment, or other natural matter. In other examples, the low-friction portion 120 may refer to any surface on which the ability of the wheels 106 of the vehicle 102 to effectively "grip" the driving surface 104 is reduced. Without limitation, the low-friction portion 120 may result at least in part, from reduced traction at the wheels 106, e.g., from worn or damaged tires or the like.

The low-friction portion 120 is illustrated in FIG. 1 for example only. As will be appreciated from the discussion provided herein, some aspects of this disclosure are particularly directed to controlling actuators on the vehicle 102 in accordance with modified or reduced torque commands in response to acceleration anomalies or conditions that may be indicative or result from wheel slip conditions. In examples detailed herein, the actuators that may be controlled according to modified torque commands can include actuators of the vehicle 102 that actuate brakes, e.g., regenerative braking systems, actuators of the vehicle 102 that cause actuation of the wheels 106, e.g., propulsion systems, and/or other actuators that control aspects of the vehicle 102.

FIG. 1 also provides a visual representation of acceleration data 124. Although not shown in FIG. 1, aspects of the drivetrain of the vehicle, including the wheels 106, axles on which the wheels 106 rotate, actuators associated with the wheels 106, e.g., for braking and/or accelerating, components of those actuators, including but not limited to rotors of the actuators, gear boxes and other transmission components, and or other components associated with propulsion and/or braking may be monitored using one or more different sensor modalities. For instance, each of the wheels 106 may include a wheel speed sensor, a rotary encoder, an inductive sensor, and/or other sensing device that monitors the rotational velocity and/or acceleration of components associated with one or more, e.g., each, of the wheels 106. For example, and without limitation, aspects of this disclosure can include measuring a rotational acceleration of a rotor of an electromagnetic motor connected to one or more of the wheels 106, e.g., via a shaft. For example, the acceleration of the rotor may be determined as revolutions per minute per second, or the like. In examples of this disclosure, the acceleration data 124 is used to determine whether a wheel slip condition exists at the vehicle 102. For instance, a very high motor angular acceleration, e.g., of a motor configured to drive one of the wheels 106, may occur when the wheels 104 lock up, particularly when driving on low friction surfaces, such as ice and snow. Specifically, large fluctuations in angular acceleration at the wheels 104 may be correlated to a wheel slip condition, e.g., because a torque is being applied to a braking actuator, but the wheels are not "gripping" the surface, and thus not rotating as expected. Conditions like these may signal anomalous conditions resulting from wheel slip conditions.

As illustrated in FIG. 1, the vehicle 102 also may include one or more vehicle computing system(s) 126. The vehicle computing system(s) 126 include one or more components that can receive the acceleration data 124 and cause the vehicle computing system(s) 126 and/or the vehicle 102 to perform various operations, e.g., to mitigate the wheel slip condition caused by the low-friction portion 120 of the driving surface 104.

As shown in FIG. 1, in aspects of this disclosure, the vehicle computing system 140 can include a torque limiting control system 128. The torque limiting control system 128 can include functionality to receive the acceleration data 124 and generate one or more modified torque limits 130. The modified torque limits 130 may be used to modify torque commands to be implemented at one or more system control components 132. More specifically, and as detailed further herein, the torque limiting control system 128 can include an acceleration monitoring component 134 and a torque limit determination component 136.

The acceleration monitoring component 134 can include functionality to receive the acceleration data 124 from one or more sensors on the vehicle 102. As noted above, the acceleration data 124 may be associated with an angular acceleration of a motor (e.g., an electromagnetic motor) associated with movement of the wheels 106. And assets of this disclosure, the acceleration monitoring component 134 can receive the acceleration data 124 in real-time or near real-time. For example, the acceleration monitoring component 134 can receive the acceleration data 124 at a high frequency. In at least one example, the frequency at which the acceleration data 124 is received may be on the order of about 60 Hz.

The acceleration monitoring component 134 can also include functionality to compare the acceleration data 124 to one or more acceleration thresholds. As noted above, a large magnitude acceleration may be indicative of a wheel slip condition, e.g., associated with a low friction surface like the low friction portion 120. In examples of this disclosure, the acceleration monitoring component 134 can determine whether a magnitude of acceleration experienced proximate the wheels 106 meets or exceeds the one or more acceleration thresholds. In one non-limiting implementation of this disclosure, the acceleration monitoring component 134 can determine whether the magnitude of acceleration is equal to or above a first acceleration threshold of about 15,000 rpm/s. For example, this acceleration magnitude may correspond to approximately 56 m/s$^2$, when converted into an equivalent vehicle acceleration. In another non-limiting implementation of this disclosure, the acceleration monitoring component 134 can determine whether the magnitude of acceleration is equal to or above a second acceleration threshold of about 20,000 rpm/s. For example, this acceleration magnitude may correspond to approximately 75 m/s$^2$, when converted into an equivalent vehicle acceleration. These thresholds are for example only and may vary based on one or more of parameters of the vehicle 102, desired vehicle functionality, and/or other factors.

The torque limit determination component 136 is configured to generate the modified torque limits 130 based at least in part on information determined by the acceleration monitoring component 134. For example, upon the acceleration monitoring component 134 determining that a first acceleration threshold is met or exceeded, the torque limit determination component 136 may determine a first corresponding modified torque limit as the modified torque limits 130. For example, the torque limit determination component 136 may determine the modified torque limits 130 based at least in part on a nominal torque limit for the vehicle 102. For example, the nominal torque limit may be a maximum allowed torque during normal or nominal operation of the vehicle 102. In one nonlimiting example, upon determining that the measured acceleration exceeds the first thresholds acceleration, the torque limit determination component may determine the modified torque limits 130 to be 80% of the nominal torque limit. Also in a non-limiting example, the torque limit determination component 136 may determine the modified torque limits 130 2B 50% of the nominal torque limit, upon a determination by the acceleration monitoring component 134 that the acceleration exceeds the second acceleration threshold.

As will be appreciated, the first acceleration threshold in the second acceleration threshold, and thus the first modified torque limit and the second modified torque limit are for example only. In other examples, only a single threshold may be used and thus only a single torque limit may be required. In other examples, the torque limit determination component 136 may determine modified torque limits 130 as a function of the magnitude of the acceleration as determined by the acceleration monitoring component 134. In such examples, the modified torque limits 130 may include any number of torque limits. In various examples, the system may maintain a first modified torque threshold for a period of time before either releasing the torque limit or modifying to a more stringent limit.

The vehicle computing systems 126 can also include functionality to transmit or otherwise provide the modified torque limits 132 the one or more system control components 132. In examples, the system control components can include one or more actuators that are configured to apply or generate an instructed torque. For example, the system control components 132 can include one or more actuators associated with a regenerative braking system. In other examples, the system control components 132 can include one or more actuators associated with drive units that are configured to propel the vehicle 102 through the environment 100.

In some examples, the system control components 132 can include one or more controllers that implement an instructed torque, e.g., received from a separate computing system, such as an electronic control unit. By providing the modified torque limits 130 to the system control components 132, the system control components can alter or modify a torque command accordingly. By way of example and not limitation, and as will be described in connection with the example of FIG. 3, below, an actuator associated with a regenerative braking system, e.g., as the system control component(s) 132, may receive a command to apply a torque of 20 kNm/s, but the torque limiting control system 128 may have detected a likely wheel slip condition and has instructed 50% of the nominal (maximum) torque as the modified torque limit 130. In this example, if the nominal torque limit is 40 kNm/s or higher, the actuator will apply the commanded 20 kNm/s torque. However, if the nominal torque limit is below 40 kNm/s, the actuator will apply a torque only up to 50% of the nominal (maximum) torque. For example, if the nominal torque is 20 kNm/s, the actuator will only apply a torque of 10 kNm/s, which is 50% of the nominal limit. These values are for reference and illustration only.

Figure 2:
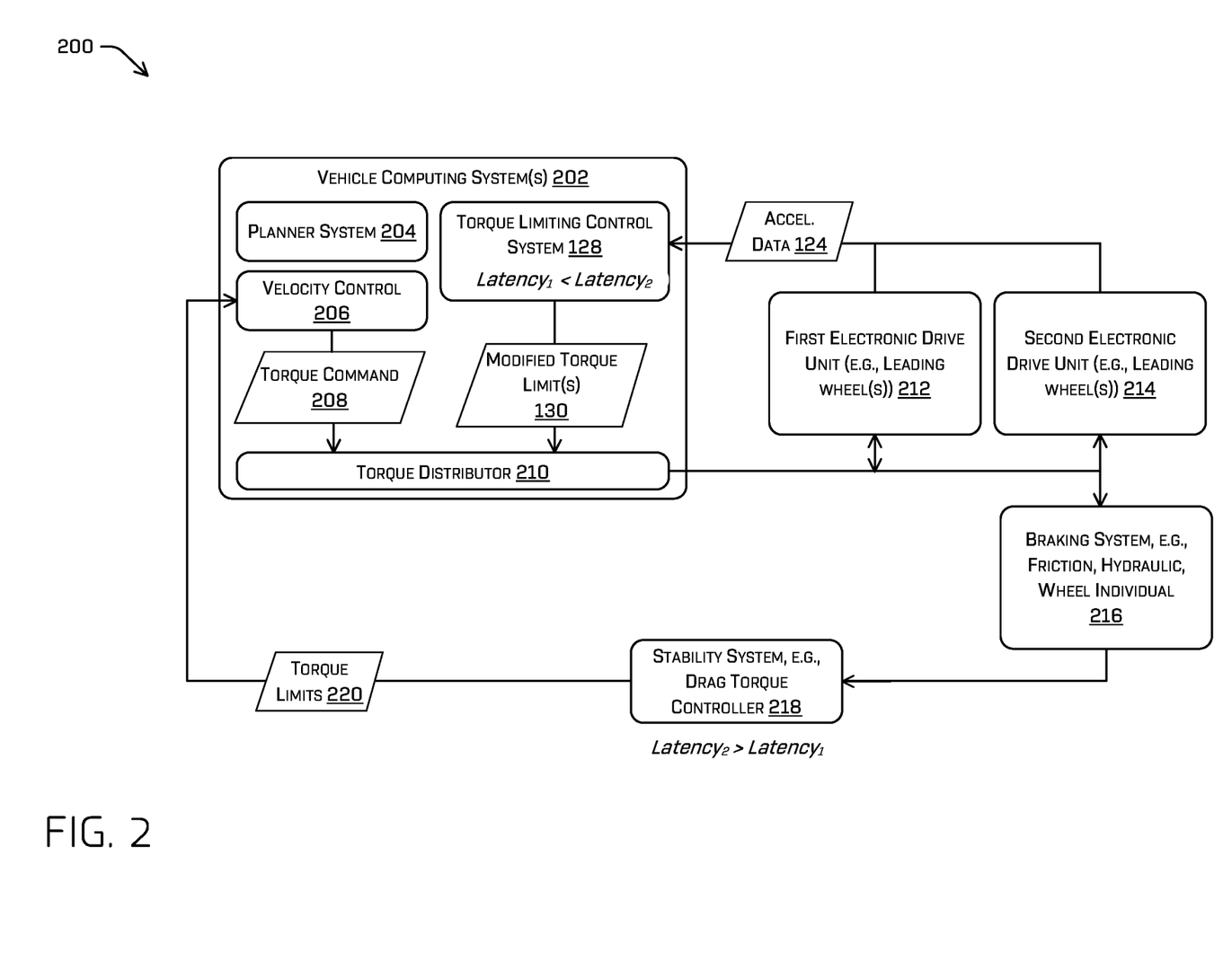
FIG. 2 is a block diagram illustrating systems and techniques for modifying torque commands to control aspects of a vehicle driving on low friction surfaces, as described herein.

Although the torque limiting control system 128 is described as being configured to determine the modified torque limits 130, in other examples, the torque limiting control system 128 may determine a modified torque command. Although not illustrated in FIG. 1, the vehicle computing system 126 may receive a conventional or determined vehicle torque command is also provided to the system control components 132 to implement nominal driving according to a planned path or trajectory. In these examples, the torque limit determination component 136 can determine a new torque command, e.g., as a percentage or function of the determined torque command, and provide a modified torque command to the system control components 132, e.g., instead of the modified torque limits 130. In various examples, such limits may be used internally (e.g., when solving for a particular trajectory in a planner system) or any other further downstream component as shown in FIG. 2. As such, any latency issues which would be present by relying on traditional systems alone may be mitigated. Importantly, such latency mitigations may improve the safe operation of the vehicle by allowing the vehicle to more quickly respond to differing driving environments.

Application of the modified torque limits 130 may promote improved traction control in the vehicle 102. For example, the torque limiting control system 128 may be configured to more quickly identify a likely wheel slip condition and implement torque limits prior to conventional driving systems recognizing loss of control associated with real slick conditions and implementing changes at the vehicle to mitigate the wheel slip conditions. For instance, conventional driving systems generally involve layers of artificial intelligence that relies on sensor data from a number of sensors, such as the sensors 116, 118, sensors associated with the wheels 106, and so forth. Because of the amount of data required for conventional driving in an autonomous vehicle like the vehicle 102, because of the redundancies in such driving systems, and/or because of other factors, there may be a delay in conventional driving systems before a wheel slip condition is recognized. The torque limiting control system 128 according to this disclosure recognizes likely real slick conditions, and preemptively applies the modified torque limits 130, e.g., to mitigate the low friction portion 120 before and until a conventional driving system takes action to respond to the anomalous (e.g., low friction) driving condition.

FIG. 2 is a block diagram of an example computing environment 200 including the torque limiting control system 128. Specifically, FIG. 2 shows the incorporation of the torque limiting control system 128 and its associated functionality, into an example conventional control system for a vehicle, such as the vehicle 102.

FIG. 2 depicts aspects of one or more vehicle computing systems 202. The vehicle computing system(s) 202 may be the same as, similar to, or otherwise associated with the vehicle computing system(s) 126 discussed above. As illustrated, the vehicle computing system(s) 202 include a planner system 204, a velocity control component 206 configured to generate torque commands 208, and a torque distributor 210. The vehicle computing system(s) 202 also are illustrated as including the torque limiting control system 128 configured to generate the modified torque limits 130, as discussed above.

The planner system 204 may be configured to determine a path for the vehicle 402 to follow to traverse through an environment. For example, the planner system 204 can determine various routes and paths and various levels of detail. In some instances, the planner system 204 can determine a route to travel from a first location (e.g., a current location) to a second location (e.g., a target location). The route may include one or more trajectories, which may include position information, e.g., the first location and the second location, as well as control or command information, including but not limited to information about velocity, acceleration, time, and/or other information used to control a vehicle including the vehicle computing system(s) 202. In some examples, the planner may rely on torque limits provided for determining the output trajectory.

The velocity control component 206 may include functionality to determine a speed or velocity to be implemented at a vehicle, e.g., to implement the path or trajectory determined by the planner system 204. For example, the velocity control component 206 may determine longitudinal velocities for the vehicle.

The velocity control component 206 may also include functionality to determine the one or more torque commands 208. For example, the velocity control component 206 may determine a torque to be applied at an actuator associated with a braking system, such as a regenerative braking system of a vehicle, e.g., to reduce a velocity of the vehicle associated with the vehicle computing systems 202. In other examples, the velocity control component 206 may determine torque to be applied at one drive units, e.g., to increase velocity of the vehicle associated with the vehicle computing systems 202. In examples, the torque command 208 determined by the velocity control component 206 may be a determined torque or a nominal torque to be applied at the associated actuator, e.g., to implement the path or trajectory determined by the planner system 204. In some examples, the torque command 208 may be determined to achieve the desired velocity or acceleration as specified by the trajectory output from the planner (whether by accelerating or decelerating).

Torque distributor 210 includes functionality to receive the torque command 208 and implement the commanded torque(s) at the appropriate actuators. In some examples, the torque command 208 may be a system or overall torque command and the torque distributor 210 may be configured to determine how and at what actuators to apply the torque command 208. For instance, when more than one actuator may be configured to apply a braking force or one or more actuators are configured to apply an acceleration force, the torque distributor 210 may determine whether and how to apply the torque command 208 across the multiple actuators.

In the example of FIG. 2, the environment 200 further includes a first electronic drive unit 212, a second electronic drive unit 214, a braking system 216, and a stability system 218. For example, one or more of the electronic drive unit 212, the second electronic drive unit 214, the braking system 216, and/or the stability system 218 may comprise the system control components 132, discussed above.

The first electronic drive unit 212 and the second electronic drive unit 214 may be configured to drive one or more wheels, such as the wheels 106 of the vehicle 102. Specifically, the first electronic drive unit 212 and the second electronic drive unit 214 may include one or more actuators configured to apply a torque to a shaft, axle, or the like, which may be connected to a wheel of the vehicle associated with the vehicle computing system(s) 202. The first electronic drive unit 212 may be associated with one or more wheels proximate a first end of the vehicle, e.g., leading wheels of the vehicle, and/or the second electronic drive unit 214 may be associated with one or more wheels proximate a second end of the vehicle, e.g., trailing wheels of the vehicle. In other examples, only a single electronic drive unit may be provided, e.g., to drive only leading wheels or trailing wheels of the vehicle. In still further examples, more electronic drive units may be provided. For example, each wheel of the vehicle may have its own associated electronic drive unit.

The first electronic drive unit 212 and/or the second electronic drive unit 214 may also be associated with a regenerative braking system. For instance, the regenerative braking system may include an actuator (e.g., the actuator of the first electronic drive unit 212 and/or an actuator of the second electronic drive unit 214) that is configured to apply a negative torque and/or generate electrical energy during braking. For example, the first electronic drive unit 212 and/or the second electronic drive unit 214 may receive (and implement) torque commands, e.g., from the torque distributor 210, to selectively accelerate or decelerate the wheels (and thus the vehicle). Although only the first electronic drive unit 212 and the second electronic drive unit 214 are shown in FIG. 2, more or fewer electronic drive units may be provided. For example, and without limitation, each of the wheels may have a dedicated drive unit, only a single drive unit may be provided, different actuators may be provided for regenerative braking and vehicle acceleration, or the like.

In examples, the braking system 216 may include a hydraulic or friction braking system. For example, in some vehicles, braking systems in addition to regenerative braking systems may be provided, e.g., as redundant braking systems and/or to implement faster or higher force braking. For example, during a braking operation, the torque distributor 210 can instruct the first electronic drive unit 212 and/or the second electronic drive unit 214 to perform some amount of regenerative braking and instruct the braking system to perform some additional amount of braking. In examples, the braking system can also (or alternatively) be a wheel-independent braking scheme, e.g., in which each of the wheels are independently controllable to perform braking operations.

The environment 200 also includes the stability system 218. In examples, the stability system generally includes functionality to determine aspects of the drive system, including wheel and/or component characteristics, and generate signals for controlling the vehicle in response thereto. For example, the stability system 218 can form a portion of a feedback loop, e.g., to receive information about the wheel(s), drive units 212, 214, braking system 216, suspension, and/or other information that may be used to generate signals to be used by the velocity control component 206 and/or other components. For example, the stability system 218 may receive information about velocity and/or acceleration associated with a wheel of the vehicle and/or of a body of the vehicle. As non-limiting examples of which, such systems may comprise electronic stability control (ESC) systems, automated braking systems (ABS), or the like.

In some examples, the stability system 218 can include a drag torque controller that receives information about the drive system of the vehicle and generates torque limits 220. For example, the stability system 218, e.g., via the drag torque controller, can respond to conditions associated with a low friction environment, e.g., by determining the torque limits 220, e.g., to avoid over-torquing the electronic drive units 212, 214. In addition, and although not illustrated in FIG. 2, the stability system 218 may send information directly to the drive units 212. 214.

During nominal or normal operation of a vehicle including the computing environment 200, the planner system 204 may generate a trajectory or path along which a vehicle is to travel. The velocity control component 206 can receive the trajectory, and based at least in part on the trajectory, determine a torque for implementation at one or more of the drive units 212, 214 to control the vehicle accordingly. The torque command(s) 208 may be passed to the torque distributor 210, which commands the drive unit(s) 212, 214 and/or the braking system 216 to implement the torque commands. The stability system 218 may receive data about driving of the vehicle, e.g., wheel accelerations, motor accelerations, which may include the acceleration data 124 above, and/or other data, and determine the torque limits 220 for implementation at the vehicle computing system(s) 202. For example, on a low friction surface, the stability system 218 may determine to implement the torque limits 220 to avoid locking up the wheels, to avoid excessive wheel spinning on the surface, and/or the like. Although the torque limit(s) 220 are illustrated as being transmitted to the velocity control component 206, in other examples the torque limit(s) 220 may be received (e.g., directly) at the torque distributor 220. For example, this just-described arrangement and functionality may be implemented via conventional vehicle control systems.

The environment 200 is also illustrated as including the torque limiting control system 128. As detailed above, the torque limiting control system 128 can receive the acceleration data 124, e.g., indicative of an acceleration measured at the first electronic drive unit 212 and/or the second electronic drive unit 214, such as an acceleration of the rotor of the motor associated with the drive unit(s). Based on the acceleration data 124, the torque limiting control system 128 can determine the modified torque limit(s) 130, e.g., to be implemented by the torque distributor.

As just described, the stability system 218, e.g., implementing the drag torque controller, may determine the torque limit(s) 220, and the torque limiting control system 128 may determine the modified torque limit(s) 130. While both the torque limit(s) 220 and the modified torque limit(s) 130 may be used to determine a torque, e.g., a torque to be implemented at the drive unit(s) 212, 214, the systems that determine the torque limits 220 and the modified torque limit(s) 130 may operate at different latencies. For example, and as illustrated, the torque limiting control system 128 stability system 218, including the drag torque controller, can determine the modified torque limit(s) 130 according to a first latency, $L_1$, which is lower than a second latency, $L_2$, at which the torque limit(s) 220 are determined. For example, the stability system 218 may include a number of processes, including processes to determine the torque limits 220, based on a number of inputs, e.g., from a number of sensors or the like. For example, the stability system 218 can include one or more machine learned models, artificial intelligence (AI) components, and/or the like. In contrast, the torque limiting control system 128 may receive the acceleration data 124, e.g., directly, determine whether the acceleration exceeds an acceleration threshold, and determine the modified torque limit(s) 130. Because the comparison can be done with minimal processing power and/or resources, the torque limiting system 128 can operate much more quickly than the stability system 218, such that the modified torque limit(s) 130 can be determined before the stability system can determine the torque limits 220 responsive to the same condition, e.g., the low friction surface.

Accordingly, the torque limiting control system 128 can configure the vehicle to respond to the low friction condition more quickly than conventional stability systems. Of course, the disclosure is not meant to be so limiting. Such a system may be advantageous even where the latency is the same and/or an operating frequency is approximately the same between the systems. In such instances, discrepancies in timing between the systems may cause one system to operate at a phase leading the other. In such examples, the independent torque limit check determined by the torque limiting system 128 may ensure a minimal amount of time while the stability system 218 updates any associated limits, as well as provides a redundant source of safety in the event of a failure of the stability system 218.

The environment 200 is illustrated as a number of modules, components, and/or sub-systems, for ease of illustration and discussion. The environment 200 is not limited to the shown arrangement. For example, although the braking system 216 and the stability system 218 are shown as separate components, in some examples these systems may be integrated into a single system. For example, aspects of the component(s) and/or system(s) may form part of an electronic stability control (ESC) system.

In the example of FIG. 2, the torque limiting control system 128 is illustrated as being associated with the vehicle computing system(s) 202. This centralized location of the torque limiting control system 128 may provide benefits, because the modified torque limit(s) 130 can be provided to the torque distributor 210. The torque distributor 210 receives other data, and thus may be configured to best implement the modified torque limit(s) 130 with a more holistic view of functioning of the vehicle. For instance, and as described herein, the torque distributor 210, upon implementing a modified torque at the first electronic drive unit 212, can also instruct the second electronic drive unit 214 to implement a higher torque, to offset the reduction at the first drive unit 212. In other examples, however, the functionality of the torque limiting control system 128 may be implemented at the drive unit(s) 212, 214. Without limitation, each of the drive unit(s) 212, 214 can monitor associated acceleration(s) to identify an anomalous acceleration and implement the modified torque limit(s) 130. As will be appreciated, applying this functionality at the drive unit(s) 212, 214 may further reduce latency, thereby allowing an even quicker implementation of the modified torque limits, although each drive unit may be acting independently at that point.

Figure 3:
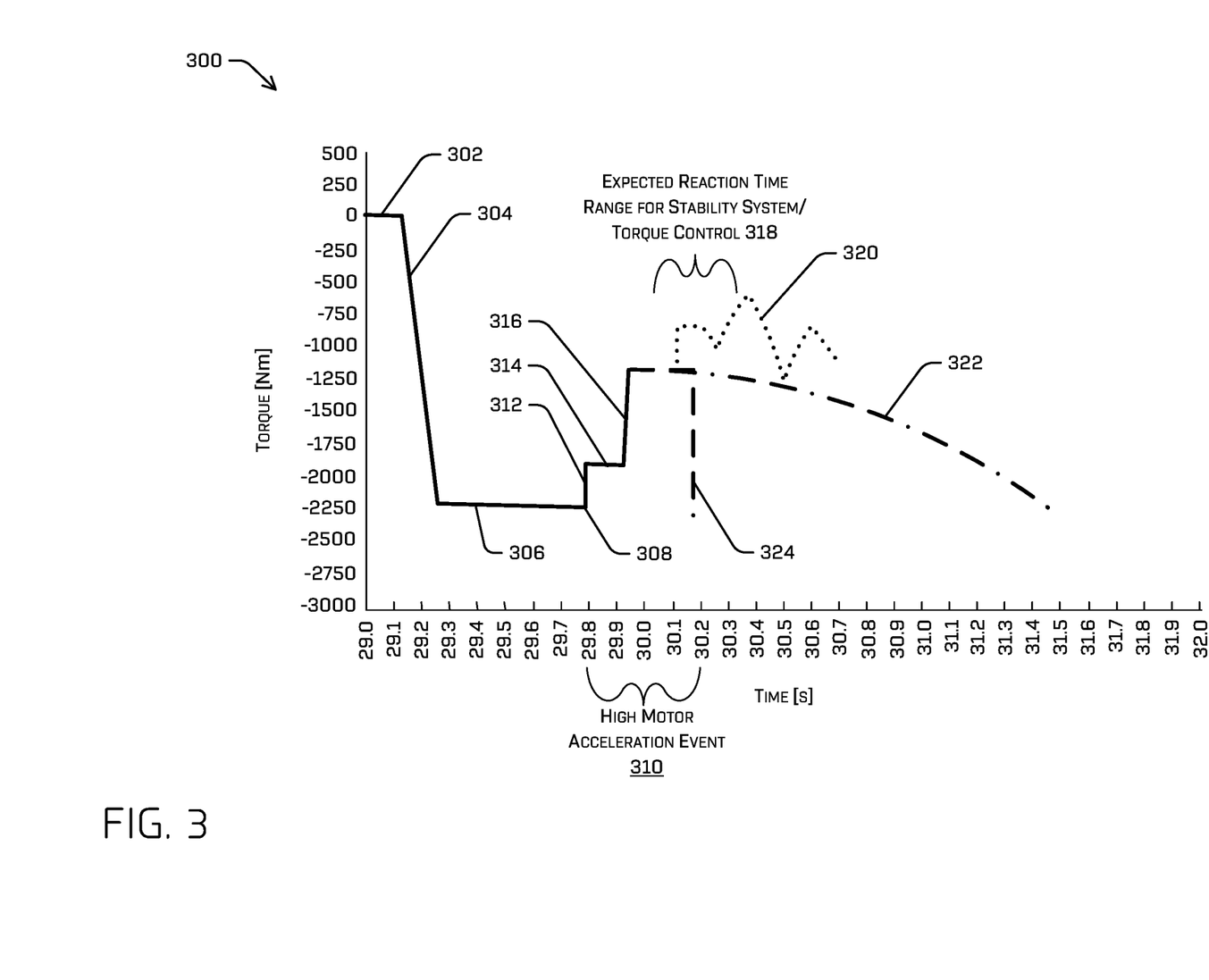
FIG. 3 is a graph showing details of a simulation conducted using the systems and techniques described herein.

FIG. 3 is a graph 300 showing example functionality according to aspects of this disclosure. For example, FIG. 3 shows a plot of torque (e.g., torque applied at one of the drive unit(s) 212, 214) versus time. In the example, a first portion 302 of a plot line shows zero acceleration at the drive unit(s). For example, the vehicle represented by the graph 300 may be operating on a road at a relatively constant velocity.

A second portion 304 of the plot line shows a sharp deceleration of the drive unit(s). For example, the second portion 304 may represent a scenario in which an obstruction or the like is in front of the vehicle, and the vehicle is to stop as quickly as possible. For example, the steep line of the second portion 304 may represent a maximum braking torque associated with the vehicle. A third portion 306 of the plot line shows a portion in which the maximum acceleration is maintained. For example, during the third portion, the drive unit(s) may be controlled to continue to apply the maximum (negative) torque, to continue sharp braking.

At a time consistent with the point 308, a high motor acceleration event 310 may be detected. For example, at the time associated with the point 308, the torque limiting system 128 can determine that an acceleration associated with the drive unit(s), e.g., an acceleration of a rotor of a motor associated with the drive unit(s) has an acceleration equal to or above a threshold acceleration. For instance, the event 310 may be associated with wheels locking up on a low friction surface.

In response to the event 310, the torque limiting system 128 can determine a modified torque limit for application at the drive unit(s). For example, and as illustrated at a portion 312 of the plot line, the applied torque is reduced, despite the continued presence of the event 310. In the example, and as shown at a portion 314 of the plot line, the reduced torque, reduced in accordance with the torque limit, is sustained for some amount of time. For example, the modified torque limit may correspond to a percentage of the maximum nominal (or allowable) torque for the drive unit(s). For example, if the portion 306 corresponds to the maximum nominal torque, the portion 314 may correspond to 80% of the maximum nominal torque. Of course, this is for example only. The modified torque limit can be any percentage or other portion of the maximum nominal torque.

In the example of FIG. 3, the graph 300 also shows another torque reduction. Specifically, a portion 316 of the plot line shows a further reduction of the torque. This reduction may correspond to implementation of a second modified torque limit. For example, and as illustrated, the high motor acceleration event 310 persists through the first reduction in torque. In some examples, the high motor acceleration event may correspond to a higher acceleration at the drive unit. In this example, a second modified torque limit is applied, which causes a further reduction in the applied torque. For example, the second modified torque limit may set a maximum torque at 50% of the maximum nominal torque associated with the drive unit(s). Of course, this is for example only, other limits may be used. Moreover, although FIG. 3 represents an example in which first and second torque limits are applied, e.g., as the modified torque limits 130, in other examples, only a single modified torque limit may be applied, or more than two modified torque limits can be applied. In the example of the FIG. 3, the first modified torque limit, e.g., associated with the portions 312 and 314 of the graph 300 can be applied in response to a measured acceleration meeting or exceeding a first acceleration threshold and/or the second modified torque limit, e.g., associated with the portion 316 of the graph 300 can be applied in response to the measured acceleration meeting or exceeding a second (e.g., higher) acceleration threshold. The second torque limit may be more drastic, and thus may only be reserved for high acceleration cases.

As illustrated in FIG. 3, the stability system is also expected to provide torque limits, e.g., the torque limits 220, responsive to the event 310 proximate a time range 318. As also illustrated, the time range 318 is later than the application of the modified torque limits at the portions 312, 314, 316. The torque limiting control system 128 more quickly infers a wheel slip or other anomalous acceleration condition than the conventional stability system 218.

As also illustrated in FIG. 3, the torque limits determined by the torque limiting control system 128 may be removed in a number of different ways. For example, a portion 320 of the plot line shows an example in which torque control is "handed off" to the stability system, e.g., to implement standard torque controls. That is, the conventional torque limit control system, which has a higher latency, may be allowed to control functionality after some threshold amount of time. In examples, the time may be associated with a difference between the latencies, with a predetermined time, and/or the like. For example, the portion 320 may be determined, at least in part, on the torque limits 220.

A portion 322 shows another example of removal of the modified torque limits. The portion 322 shows a gradual reduction of the torque limit, e.g., over some amount of time. In this example, the modified torque limit(s) may be applied for a predetermined amount of time, e.g., 0.3 seconds, or the like, and may be gradually reduced, e.g., over a second or the like. Another portion 324 of the graph 300 shows another example of removal of the modified torque limits. In this example, instead of a gradual removal, the torque limits are (completely) removed. For example, the removal may be after a predetermined amount of time from implementation of the modified torque limits. In other examples, the removal of the modified torque limits may be after a predetermined amount of time from which the anomalous acceleration is no longer detected. In other examples, the modified torque limits can be removed upon determining that the anomalous acceleration is no longer present. Other triggers may also be used for removal of the modified torque limits.

In some examples, the graph 300 can correspond to torque control at a drive unit associated with a subset of wheels of the vehicle. For example, the graph 300 can correspond to control of a drive unit associated with leading wheels or trailing wheels of the vehicle. In these examples, a second drive unit may be associated with the other of the leading wheels or the trailing wheels. In some examples, when the modified torque limits result in a modified torque, e.g., a torque lower than a commanded torque, a difference between the command torque and the modified torque may be applied at the second drive unit(s). Thus, in addition to causing a torque reduction to mitigate the effects of a low friction surface, implementations of this disclosure can force the vehicle to engage a second drive unit, e.g., to compensate for the reduced torque. For example, this functionality may cause the vehicle to operate in an all-wheel drive mode, such that the full commanded torque is applied across two drive units, with neither exceeding the modified torque limit. Of course, all wheel drive can provide additional benefits, e.g., because not all wheels may be encountering the low friction surface.

Figure 4:
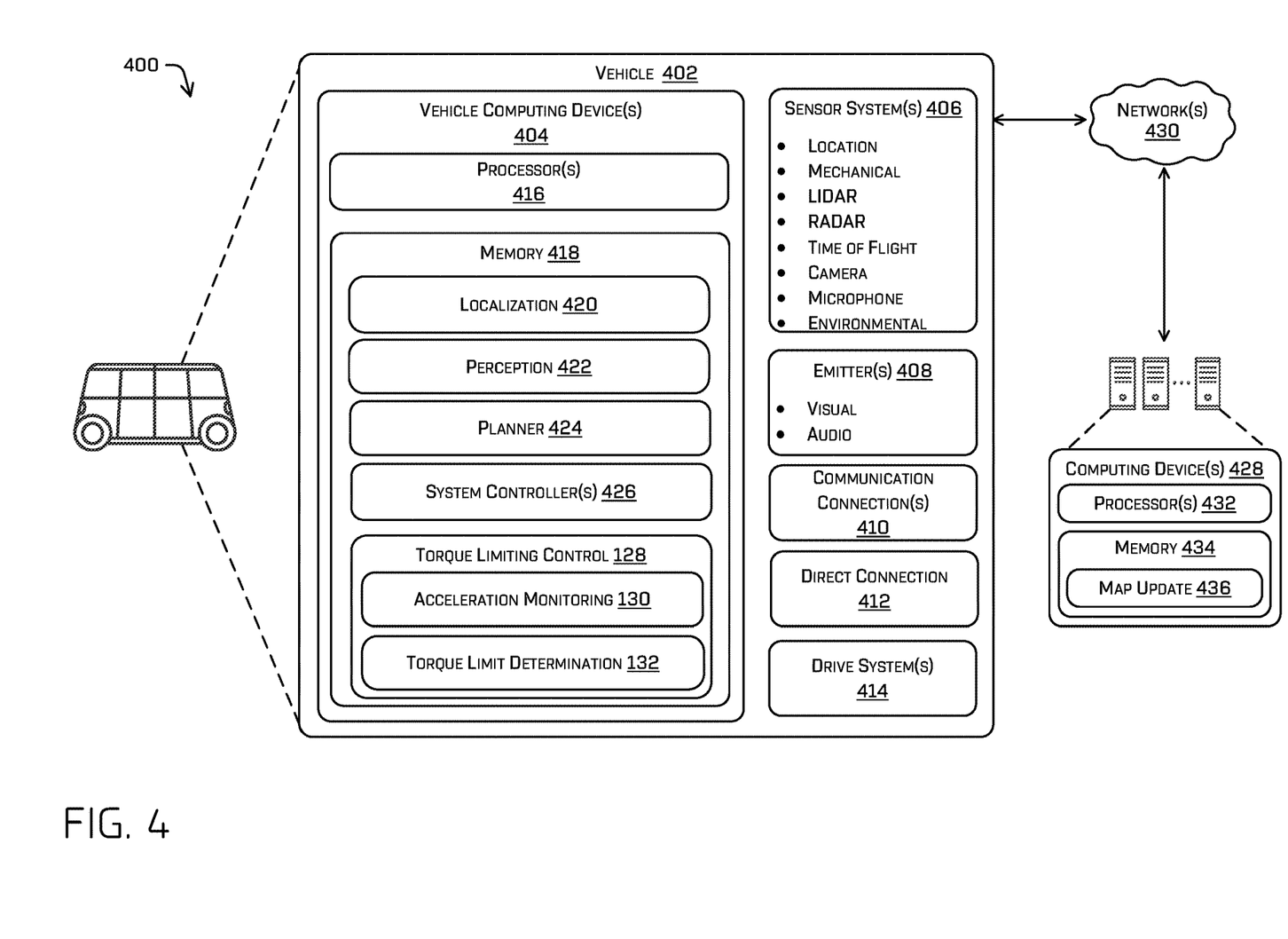
FIG. 4 is a block diagram of an example system for implementing the techniques described herein.

FIG. 4 is a block diagram of an example system for the techniques described herein. In at least one example, the system 400 can include a vehicle 402. In the illustrated example system 400, the vehicle 402 is an autonomous vehicle: however, the vehicle 402 can be any other type of vehicle.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein can be incorporated into any ground-borne, airborne, or water-borne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414.

The one or more sensor system(s) 406 can be configured to capture sensor data associated with an environment. In implementations of this disclosure, the sensor system(s) 406 can include one or more radar sensors, and in particular may include one or more 4D radar sensors. The one or more sensor system(s) 406 can also, or alternatively, include time-of-flight sensors, location sensors (e.g., GPS, compass, etc.), inertial sensors (e.g., inertial measurement units (IMUs), accelerometers, magnetometers, gyroscopes, etc.), lidar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which can comprise acoustic beam steering technology.

The vehicle 402 can also include one or more communication connection(s) 410 that enable communication between the vehicle 402 and one or more other local or remote computing device(s) (e.g., a remote teleoperation computing device) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Without limitation, the drive system(s) 414 can include the system control component(s) 132 and/or the drive unit(s) 212, 214. Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a localization component 420, a perception component 422, a planning component 424, one or more system controller(s) 426, and the torque liming control system 128. Though depicted as residing in the memory 418 for illustrative purposes, it is contemplated that one or more of components in the memory 418 can additionally, or alternatively, be accessible to the computing device 404 (e.g., stored in a different component of vehicle 402) and/or be accessible to the vehicle 402 (e.g., stored remotely). Moreover, although the components are shown as separate modules or components for illustration and clarity, in examples the components may be otherwise configured. For example, aspects of the torque limiting control component 128 can be implemented as a portion of the planner system 424 and/or drive system(s) 414.

In memory 418 of the computing device 404, the localization component 420 can include functionality to receive data from the sensor system(s) 406 to determine a position of the vehicle 402. For example, the localization component 420 can include and/or request/receive a three-dimensional map of an environment and can continuously determine a location of the autonomous vehicle within the map. In some instances, the localization component 420 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 420 can provide data to various components of the vehicle 402 to determine an initial position of an autonomous vehicle for generating a trajectory, as discussed herein.

The perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 422 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 422 can use perception algorithms to determine a perception-based bounding box associated with an object in the environment based on sensor data. For example, the perception component 422 can receive image data and classify the image data to determine that an object is represented in the image data. Then, using detection algorithms, the perception component 422 can generate a two-dimensional bounding box and/or a perception-based three-dimensional bounding box associated with the object. The perception component 422 can further generate a three-dimensional bounding box associated with the object. The three-dimensional bounding box can provide additional information such as a location, orientation, pose, and/or size (e.g., length, width, height, etc.) associated with the object.

The perception component 422 can include functionality to store perception data generated by the perception component 422. In some instances, the perception component 422 can determine a track corresponding to an object that has been classified as an object type. For purposes of illustration only, the perception component 422, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The planning component 424 can determine a path for the vehicle 402 to follow to traverse through an environment. For example, the planning component 424 can determine various routes and paths and various levels of detail. The planning component 424 can be the planner system 204, for example. In some instances, the planning component 424 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 424 can generate an instruction for guiding the autonomous vehicle along at least a portion of the route from the first location to the second location. In at least one example, the planning component 424 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level can be selected to operate the vehicle.

In other examples, the planning component 424 can alternatively, or additionally, use data from the perception component 422 and/or a prediction component to determine a path for the vehicle 402 to follow to traverse through an environment. For example, the planning component 424 can receive data from the perception component 422 and/or the prediction component regarding objects associated with an environment. Using this data, the planning component 424 can determine a route to travel from a first location (e.g., a current location) to a second location (e.g., a target location) to avoid objects in an environment. In at least some examples, such a planning component 424 can determine there is no such collision free path and, in turn, provide a path which brings vehicle 402 to a safe stop avoiding all collisions and/or otherwise mitigating damage. In examples, the planning component 424 may correspond to the planner system 204

In at least one example, the computing device 404 can include the one or more system controller(s) 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402, which can be configured to operate in accordance with a path provided from the planning component 424. In examples, the system controller(s) 426 can comprise the stability system 218 and/or the velocity control component 206.

The vehicle 402 can also connect to computing device(s) 428 via a network 430. The computing device(s) 428 can include one or more processor(s) 432 and memory 434 communicatively coupled with the one or more processor(s) 432. In at least one instance, the one or more processor(s) 432 can be similar to the processor(s) 416 and the memory 434 can be similar to the memory 418. In examples, the memory 434 can store one or more components to perform any of the functionality described herein.

As illustrated in FIG. 4, the memory 434 can include a map updating component 436. For example, the map updating component 436 can include functionality to update one or more maps to identify or annotate the low friction portion 120. For example, the map(s) may be accessible by the vehicle 402 and/or vehicles other than the vehicle 402, e.g., a fleet of vehicles. By updating the maps to indicate the likely presence of a low friction portion, safety outcomes may be improved and/or the low friction portion can be monitored for persistence/absence on future trips in the area.

The processor(s) 416 of the computing device 404 and the processor(s) 432 of the computing device(s) 4284 can be any suitable processor capable of executing instructions to process data and perform operations as described herein. By way of example and not limitation, the processor(s) 416 and 432 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 of the computing device 404 and the memory 434 of the computing device(s) 428 are examples of non-transitory computer-readable media. The memory 418, 434 can store an operating system and one or more software applications, instructions, programs, and/or data to implement the methods described herein and the functions attributed to the various systems. In various implementations, the memory 418, 434 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 438 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
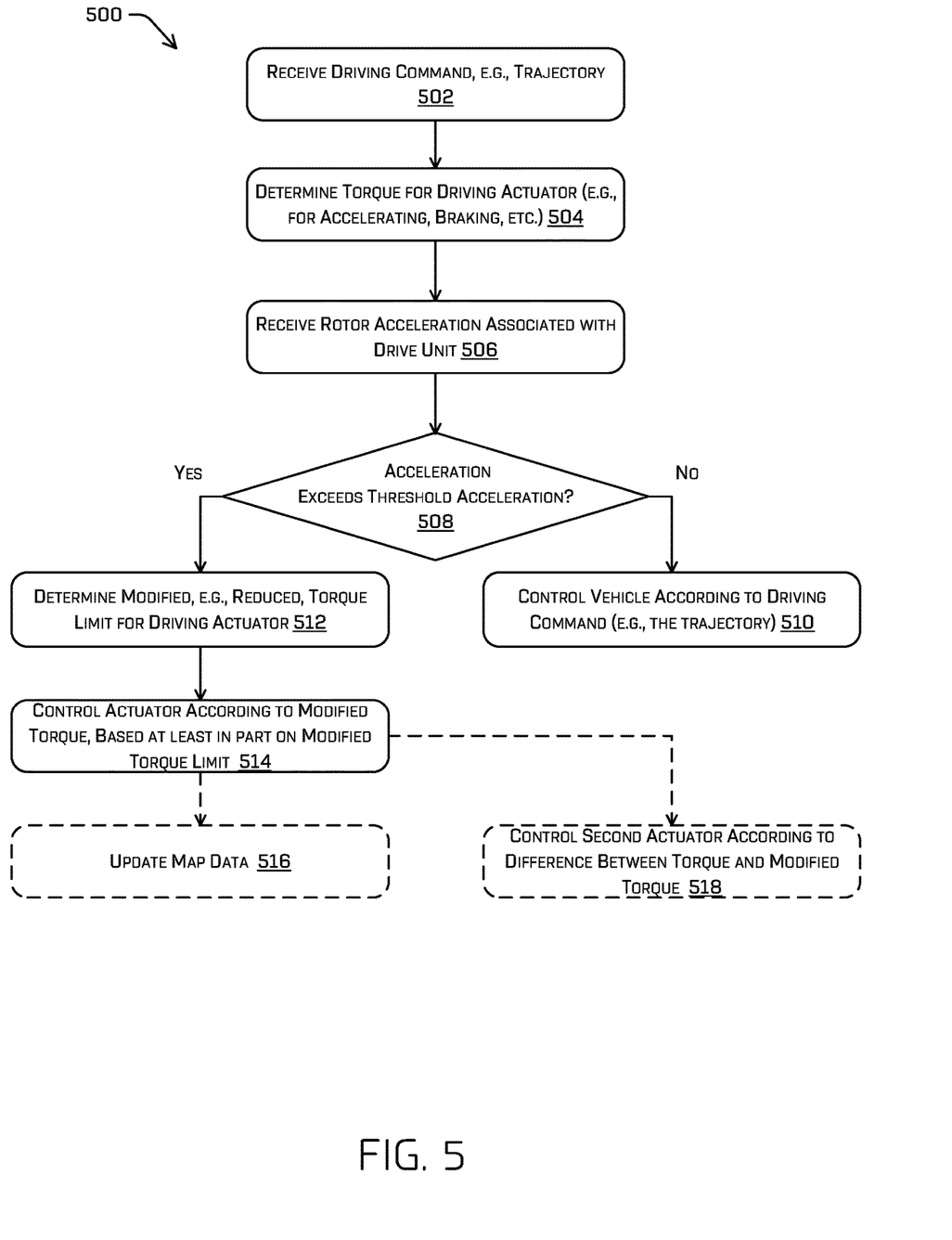
FIG. 5 is a flowchart of an example process for modifying torque commands to control aspects of a vehicle driving on low friction surfaces, according to aspects of this disclosure.

FIG. 5 is an example process of controlling a vehicle on a low friction or other anomalous driving condition. For example, some or all of the process 500 can be performed by one or more components in FIG. 1, FIG. 2, and/or FIG. 7, as described herein. For example, some or all of the process 500 can be performed by the torque limiting control component 128, as detailed herein.

At an operation 502, the process can include receiving a driving command. For example, the driving command may be a trajectory along which a vehicle, such as an autonomous vehicle, is to travel through an environment. The driving command can also or alternatively include a commanded velocity, acceleration, and/or the like.

At operation 504, the process 500 can include determining a torque for driving an actuator. For example, the operation 504 can include determining, based at least in part on the driving command, a torque to be applied to an actuator of a driving unit, like the drive unit(s) 212, 214. In some examples, the operation 504 can include determining a determined torque for applying to a motor of the drive unit(s) 212, 214 to accelerate the vehicle or to cause the vehicle to decelerate (e.g., via a regenerative braking system).

At an operation 506, the process can include receiving a rotor acceleration associated with a drive unit of the vehicle. For example, the drive unit can include a motor having a rotor and a stator. A sensor may be associated with the rotor, e.g., to determine an acceleration of the rotor.

At operation 508, the process 500 can include determining whether the acceleration meets or exceeds a threshold acceleration. In examples described herein, the acceleration at the rotor of a drive unit may be expected to be within some threshold range. However, an excessive rotor acceleration may result from some anomalous driving condition, such as when the wheels of the vehicle are on a low friction surface. For example, applying a braking torque to wheels that have locked up or applying an accelerating torque to wheels that are slipping will result in large accelerations at the rotor of the motor. Accordingly, accelerations that exceed some threshold acceleration(s) can be used to infer a low friction driving situation.

If, at the operation 508, it is determined that the acceleration does not exceed a threshold acceleration, at an operation 510, the process 500 can include controlling the vehicle according to the driving command. For example, in the absence of an excess acceleration, the vehicle can be controlled with nominal controls, e.g., according to the initially instructed driving command or trajectory.

However, if at the operation 508 it is determined that the acceleration meets or exceeds the threshold acceleration, the process 500 can include, at an operation 512, determining a modified torque limit for driving the actuator. For example, and as described herein, the torque limit determination component 132 can determine the modified torque limit(s) 130. For instance, the modified torque limit(s) 130 can be a reduced torque relative to the nominal maximum torque associated with the drive unit. The modified torque limit(s) 130 can be a percentage of the nominal maximum torque. By reducing the maximum torque, wheel locking and/or wheel slip, which can occur on low friction surfaces, can be reduced.

At an operation 514, the process 500 can include controlling the actuator according to a modified torque, based at least in part on the modified torque limit. The graph 300 of FIG. 3 illustrates an example implementation of applying modified torques in response to anomalous acceleration conditions, as detailed above.

At an operation 516, the process 500 can optionally include updating map data. As discussed herein, the excessive acceleration, e.g., determined at the operation 508, may be used to infer a wheel slip or other event associated with driving on a low friction surface. In examples, knowledge of the existence of the low friction surface can be useful to further operation of the vehicle and/or to other vehicles. Map data used by one or more vehicles for navigation can be annotated or otherwise generated to indicate the presence of the driving surface anomaly. Accordingly, a vehicle may navigate the space with additional information about the anomaly, e.g., by reducing a maximum speed, applying torque limits preemptively, or otherwise altering a trajectory. Such map data may be transmitted to a repository/data store (whether central or distributed) and combined with previous and or other indications of surface friction and made available to one or more other vehicles. In response, such additional vehicles may modify driving behavior in anticipation of such surface conditions.

At an operation 518, the process 500 can optionally include controlling the a second actuator according to a difference between the torque and the modified torque. For example, when the process 500 is used to reduce a torque applied at a first drive unit, e.g., to stay at or below a modified torque limit, desired torque in excess of the modified torque may be applied at a second drive unit. Functionally, the operation 518 can include implementing four-wheel acceleration and/or four-wheel braking control.

EXAMPLE CLAUSES

A: An example vehicle includes: one or more wheels: a drive unit including a motor to drive the one or more wheels: a sensor configured to detect an acceleration of the motor: one or more processors; and one or more non-transitory media storing instructions that, when executed by the one or more processors, perform operations comprising: receiving a command for controlling the vehicle: determining, based at least in part on the command, a determined torque for application at the drive unit; receiving, from the sensor, a measured acceleration of the motor: determining, based at least in part on the measured acceleration being equal to or exceeding a threshold acceleration, a wheel slip condition: determining, based at least in part on the wheel slip condition and the determined torque, a modified torque limit; and controlling the drive unit according to the modified torque limit.

B: The vehicle of example A, wherein the controlling the drive unit according to the modified torque limit comprises reducing the determined torque to be less than or equal to a maximum nominal torque to define a modified torque, and causing the drive unit to provide the modified torque.

C: The vehicle of example A or example B, wherein the modified torque limit is a percentage of a maximum nominal torque the drive unit is configured to provide.

D: The vehicle of any one of example A through example C, wherein the drive unit is a first drive unit, the vehicle further comprising: a second drive unit configured to drive a second component of the vehicle, the operations further comprising: driving the first drive unit according to a modified torque based at least in part on the modified torque limit; and driving the second drive unit based at least in part on a difference between the determined torque and the modified torque.

E: The vehicle of any one of example A through example D, further comprising: a drag torque control unit configured to determine torque commands and associated with a first latency, wherein the determining the modified torque limit is associated with a second latency, lower than the first latency.

F: The vehicle of any one of example A through example E, the operations further comprising: after a predetermined time of controlling the drive unit according to the modified torque limit, at least one of: controlling the drive unit at the exclusion of the modified torque limit, controlling the drive unit according to a second modified torque limit, different from the modified torque limit, or controlling the drive unit in accordance with the torque commands determined by the drag toque control unit.

G: An example method includes: receiving a command to control a vehicle; determining, based at least in part on the command, a determined torque for driving an actuator on the vehicle: determining an acceleration associated with the actuator; determining, based at least in part on the acceleration associated with the actuator meeting or exceeding a threshold acceleration, a modified torque limit; and controlling the actuator according to the modified torque limit.

H: The method of example G, wherein the actuator is a motor and wherein the determining the acceleration associated with the actuator comprises determining an acceleration of a rotor of the motor.

I: The method of example G or example H, wherein the controlling the actuator according to the modified torque limit comprises: reducing the determined torque to be less than or equal to a maximum nominal torque to define a modified torque, and causing the actuator to provide the modified torque.

J: The method of any one of example G through example I, wherein the modified torque limit is a percentage of a maximum nominal torque the drive unit is configured to provide.

K: The method of any one of example G through example J, wherein the actuator is associated with a braking system, and the modified torque is a reduced torque relative to the determined torque to prevent excessive braking during a wheel slip condition.

L: The method of any one of example G through example K, wherein: the actuator is associated with a drive unit configured to drive one or more wheels of the vehicle; and the controlling the actuator comprises driving the drive unit according to a modified torque less than the determined torque and based at least in part on the modified torque limit.

M: The method of any one of example G through example L, further comprising: driving a second drive unit associated with a subset of the one or more wheels of the vehicle based at least in part on a difference between the determined torque and the modified torque: wherein the drive unit is associated with one of leading wheels or trailing wheels of the vehicle and the second drive unit is associated with other of the leading wheels or the trailing wheels of the vehicle.

N: The method of any one of example G through example M, further comprising: after a predetermined time of controlling the actuator according to the modified torque limit, at least one of: controlling the drive unit at the exclusion of the modified torque limit, controlling the drive unit according to a second modified torque limit, different from the modified torque limit, or controlling the drive unit in accordance with torque commands from a dynamic toque control unit.

O: The method of any one of example G through example N, further comprising: determining, based at least in part on the acceleration associated with the actuator meeting or exceeding the threshold acceleration, an unsafe driving condition; determining a location of the unsafe driving condition; and updating map data to identify the unsafe driving condition at the location.

P: One or more example non-transitory computer-readable media storing instructions that, when executed, cause one or more processors to perform operations comprising: receiving a command to control a vehicle: determining, based at least in part on the command, a determined torque for driving a drive unit on the vehicle; determining an acceleration associated with the drive unit: determining, based at least in part on the acceleration meeting or exceeding a threshold acceleration, a modified torque limit for the drive unit; and controlling the drive unit according to the modified torque limit.

Q: The one or more non-transitory computer-readable media of example P, wherein the controlling the drive unit according to the modified torque limit comprises: reducing the determined torque to be less than or equal to a maximum nominal torque associated with the drive unit to define a modified torque, and causing the drive unit to provide the modified torque.

R: The one or more non-transitory computer-readable media of example P or example Q, wherein the modified torque limit is a percentage of a maximum nominal torque the drive unit is configured to provide.

S: The one or more non-transitory computer-readable media of any one of example P through example R, wherein the acceleration is an acceleration of a rotor in the motor.

T: The one or more non-transitory computer-readable media of any one of example P through example S, wherein: the drive unit is configured to drive one or more wheels of the vehicle; and the controlling the drive unit comprises driving the drive unit according to a modified torque less than the determined torque and based at least in part on the modified torque limit, the operations further comprising: driving a second drive unit associated with other of the one or more wheels of the vehicle based at least in part on a difference between the determined torque and the modified torque, wherein the first drive unit is associated with one of leading wheels or trailing wheels of the vehicle and the second drive unit is associated with other of the leading wheels or the trailing wheels of the vehicle.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   one or more wheels;
   a drive unit including a motor to drive the one or more wheels;
   a sensor configured to detect an acceleration of the motor;
   a drag torque control unit configured to determine torque commands and associated with a first latency;
   one or more processors; and
   one or more non-transitory media storing instructions that, when executed by the one or more processors, perform operations comprising:
      receiving a command for controlling the vehicle;
      determining, based at least in part on the command, a determined torque for application at the drive unit;
      receiving, from the sensor, a measured acceleration of the motor;
      determining, based at least in part on the measured acceleration being equal to or exceeding a threshold acceleration, a wheel slip condition;
      determining, based at least in part on the wheel slip condition and the determined torque, a modified torque limit, wherein the determining the modified torque limit is associated with a second latency, lower than the first latency; and
      controlling the drive unit according to the modified torque limit.

2. The vehicle of claim 1, wherein the controlling the drive unit according to the modified torque limit comprises:
   reducing the determined torque to be less than or equal to a maximum nominal torque to define a modified torque, and
   causing the drive unit to provide the modified torque.

3. The vehicle of claim 1, wherein the modified torque limit is a percentage of a maximum nominal torque the drive unit is configured to provide.

4. The vehicle of claim 1, wherein the drive unit is a first drive unit, the vehicle further comprising:
   a second drive unit configured to drive a component of the vehicle, the operations further comprising:
      driving the first drive unit according to a modified torque based at least in part on the modified torque limit; and
      driving the second drive unit based at least in part on a difference between the determined torque and the modified torque.

5. The vehicle of claim 1, the operations further comprising:
   after a predetermined time of controlling the drive unit according to the modified torque limit, at least one of:
      controlling the drive unit at the exclusion of the modified torque limit,
      controlling the drive unit according to a second modified torque limit, different from the modified torque limit, or
      controlling the drive unit in accordance with the torque commands determined by the drag torque control unit.

6. A method comprising:
   receiving a command to control a vehicle;
   determining, based at least in part on the command, a determined torque for driving a first drive unit on the vehicle;
   determining an acceleration associated with the first drive unit;
   determining, based at least in part on the acceleration associated with the first drive unit meeting or exceeding a threshold acceleration, a modified torque limit;
   controlling the first drive unit according to a modified torque based at least in part on the modified torque limit; and
   controlling a second drive unit based at least in part on a difference between the determined torque and the modified torque.

7. The method of claim 6, wherein the first drive unit is a motor and wherein the determining the acceleration associated with the actuator comprises determining an acceleration of a rotor of the motor.

8. The method of claim 6,
wherein the controlling the first drive unit according to the modified torque limit comprises:
reducing the determined torque to be less than or equal to a maximum nominal torque to define a modified torque, and
causing the first drive unit to provide the modified torque.

9. The method of claim 6, wherein the modified torque limit is a percentage of a maximum nominal torque the first drive unit is configured to provide.

10. The method of claim 6, wherein the first drive unit is associated with a braking system, and the modified torque is a reduced torque relative to the determined torque to prevent excessive braking during a wheel slip condition.

11. The method of claim 6, wherein:
the first drive unit is configured to drive one or more wheels of the vehicle; and
the controlling the first drive unit comprises driving the first drive unit according to a modified torque less than the determined torque and based at least in part on the modified torque limit.

12. The method of claim 11, wherein the first drive unit is associated with one of leading wheels or trailing wheels of the vehicle and the second drive unit is associated with other of the leading wheels or the trailing wheels of the vehicle.

13. The method of claim 6, further comprising:
after a predetermined time of controlling the first drive unit according to the modified torque limit, at least one of:
controlling the first drive unit at the exclusion of the modified torque limit,
controlling the first drive unit according to a second modified torque limit, different from the modified torque limit, or
controlling the first drive unit in accordance with torque commands from a dynamic torque control unit.

14. The method of claim 6, further comprising:
determining, based at least in part on the acceleration associated with the first drive unit meeting or exceeding the threshold acceleration, an unsafe driving condition;
determining a location of the unsafe driving condition; and
updating map data to identify the unsafe driving condition at the location.

15. One or more non-transitory computer-readable media storing instructions that, when executed, cause one or more processors to perform operations comprising:
receiving a command to control a vehicle;
determining, based at least in part on the command, a determined torque for driving a first drive unit on the vehicle;
determining an acceleration associated with the first drive unit;
determining, based at least in part on the acceleration meeting or exceeding a threshold acceleration, a modified torque limit for the drive unit;
controlling the first drive unit according to a modified torque based at least in part on the modified torque limit; and
controlling a second drive unit based at least in part on a difference between the determined torque and the modified torque.

16. The one or more non-transitory computer-readable media of claim 15, wherein the controlling the first drive unit according to the modified torque comprises:
reducing the determined torque to be less than or equal to a maximum nominal torque associated with the drive unit to define the modified torque, and
causing the first drive unit to provide the modified torque.

17. The one or more non-transitory computer-readable media of claim 15, wherein the modified torque limit is a percentage of a maximum nominal torque the first drive unit is configured to provide.

18. The one or more non-transitory computer-readable media of claim 15, wherein the acceleration is an acceleration of a rotor in a motor of the first drive unit.

19. The one or more non-transitory computer-readable media of claim 15, wherein:
wherein the first drive unit is associated with one of leading wheels or trailing wheels of the vehicle and the second drive unit is associated with other of the leading wheels or the trailing wheels of the vehicle.

20. The method of claim 6, wherein the determining the modified torque limit is associated with a first latency lower than a second latency associated with determining torque commands at a drag torque control unit.

* * * * *